US009711953B2

United States Patent
Peplinski et al.

(10) Patent No.: US 9,711,953 B2
(45) Date of Patent: Jul. 18, 2017

(54) FUSE DISCONNECT SAFETY SWITCH (FDSS)

(71) Applicant: Bentek Corporation, San Jose, CA (US)

(72) Inventors: James Peplinski, Fremont, CA (US); Mitchell Schoch, Pleasanton, CA (US)

(73) Assignee: Bentek Corporation, Santa Jose, CA (US)

( * ) Notice: Subject to any disclaimer, the term of this patent is extended or adjusted under 35 U.S.C. 154(b) by 0 days.

(21) Appl. No.: 14/968,369

(22) Filed: Dec. 14, 2015

(65) Prior Publication Data

US 2016/0190774 A1    Jun. 30, 2016

Related U.S. Application Data

(63) Continuation of application No. 13/893,226, filed on May 13, 2013, now Pat. No. 9,214,791.

(60) Provisional application No. 61/677,854, filed on Jul. 31, 2012, provisional application No. 61/798,298, filed on Mar. 15, 2013.

(51) Int. Cl.
| | |
|---|---|
| *H02B 1/06* | (2006.01) |
| *H02J 4/00* | (2006.01) |
| *H02B 3/00* | (2006.01) |

(52) U.S. Cl.
CPC ............. *H02B 1/066* (2013.01); *H02B 3/00* (2013.01); *H02J 4/00* (2013.01)

(58) Field of Classification Search
CPC .  H02B 1/32; H02B 1/26; H02B 1/066; H02B 3/00; G05B 9/02
USPC ................ 361/626, 628, 630, 631, 732, 837
See application file for complete search history.

(56) References Cited

U.S. PATENT DOCUMENTS

| 5,508,891 | A | * | 4/1996 | Rowe | H02B 11/12 361/727 |
|---|---|---|---|---|---|
| 5,670,936 | A | * | 9/1997 | Estes | H02M 5/00 307/131 |
| 9,214,791 | B1 | * | 12/2015 | Peplinski | H02B 3/00 |
| 2011/0310533 | A1 | * | 12/2011 | Cosley | H02B 1/32 361/632 |
| 2013/0058013 | A1 | * | 3/2013 | Cutler | H01H 31/12 361/626 |

* cited by examiner

*Primary Examiner* — Anthony Haughton
*Assistant Examiner* — Yahya Ahmad
(74) *Attorney, Agent, or Firm* — Brundidge & Stanger, P.C.

(57) ABSTRACT

Various embodiments provide safety disconnect systems for a power system. In one aspect, a safety switch system and method for a power system, including a plurality of sequentially interlocked switches capable of being operated in a predetermined sequence to isolate one or more fuses, is provided. The described safety switch system is a convenient and sequential approach to safely remove power from a system and access associated fuses.

20 Claims, 9 Drawing Sheets

FUSE DISCONNECT SAFETY SWITCH (FDSS)

CROSS REFERENCE TO RELATED APPLICATION

Under 35 U.S.C. 120, this application is a Continuation application and claims priority to U.S. application Ser. No. 13/893,226, filed May 13, 2013, entitled "FUSE DISCONNECT SAFETY SWITCH (FDSS)", which claims the benefit of priority of U.S. Patent Application No. 61/677,854, filed on Jul. 31, 2012, entitled "FUSE DISCONNECT SAFETY SWITCH (FDSS)," and U.S. Patent Application No. 61/798,298, filed on Mar. 15, 2013, entitled "FUSE DISCONNECT SAFETY SWITCH (FDSS)," all of which are incorporated herein by reference.

FIELD OF THE INVENTION

The present invention relates to circuit disruption systems, and more particularly to safety disconnects for power systems such as circuit breakers and housings thereof.

BACKGROUND

Circuit breakers are typically situated in electrical enclosures, or panels, and are used to control the availability of current for connected electrical circuits. A panel typically includes a plurality of circuit breakers and may include a plurality of rows of circuit breakers. Typically, a panel is connected to a physical structure such as a wall or building side and the power to the panel is sourced from an electric power grid through a rated meter. In operation, a circuit breaker is activated to disrupt power to a circuit upon the occurrence of an event such as an overload, over-demand, short-circuit, etc., and are used for most every power source access point to a residence, an industrial facility, etc.

A circuit breaker safety switch (CBSS) is a device which also includes circuit breakers. A CBSS is typically designed for large photovoltaic (PV) solar systems and is intended for installation next to an inverter, for instance. A CBSS provides multiple UL 1000V load-break circuit breakers combined into one easy-to-install, safe compact enclosure. A CBSS, similar to a panel, provides circuit protection and individual disconnects but also eliminates fuses, provides for compliance with varied disconnect and core requirements and also provides for complete isolation of inverter fuses.

Load-break switches are another type of safety switch which may also be used to isolate a PV system (typically on the DC-current side), although a load-break switch is typically larger than the traditional-style and may therefore present more of a challenge to fit more of them into a panel, for instance.

Users, operators and others who have access to the source of power (power system) entering a particular location, may have a need to disconnect one or more of the power inputs to the power system from a power feed source. For example, if one of the power sources fails, or a connection in the system fails, then the power inputs need to be disconnected from the load so that the faulty components can be repaired or replaced without exposing one who is to access the panel to high voltage or current. In typical power systems, a safety switch can be connected between a power source and other component using the power. For example, a safety switch can be connected between a combiner and an inverter in a solar power system, or between a combiner and a recombiner.

However, traditional safety switches are often expensive and may be labor-intensive to install and maintain. Typically, a safety switch is provided in each enclosure, such as a metal cabinet, and several enclosures must be provided to allow for safety disconnects for several power lines. A conduit with heavy protective cladding must also be routed from a power connection to each safety switch enclosure. If multiple power lines are used, such as in solar power systems, a safety enclosure on each power line becomes burdensome and adds further expense in an installation. Further, as an enclosure becomes more crowded due to the presence of switches and other components, its operation and access also becomes more difficult.

Therefore, it is advantageous to be able to access such switches in an inactive state, where the person accessing the switch can ensure that the power to the switch is disconnected, in part to avoid additional delays and costs. However, given the complexity of traditional safety switches, determining the condition of the state for such is difficult. Similarly, having only a window or similar cut-out access to "see inside" the enclosure would be ineffective, particularly in cases where a load-break switch is used where its arcing would soon render the window clouded or opaque. Therefore, what is desired is a safety switch which provides a user the ability to visibly determine the state or status of the connection of the device to a power source, where separation of contacts may be determined, for instance.

As used herein, the terms CBSS, load-break switches, non-load-break switches, circuit breakers and the like, are intended to be used interchangeably, and may comprise a portion or totality of a switch or safety switch.

SUMMARY

The present invention fulfills these needs and has been developed in response to the present state of the art, and in particular, in response to the problems and needs in the art that have not yet been fully solved by currently available technologies.

In one embodiment, the present invention provides for a safety switch system for a power system. The system preferably includes a plurality of sequentially interlocked switches capable of being operated in a predetermined sequence to isolate one or more fuses; one or more exterior switches on an outer side of a door; one or more interior switches at an inner portion; and, a handle interlocked with the door. In operation, the system is operable in a predetermined manner in order to isolate power from the system and enable an operator to access the fuses safely.

In another embodiment, the present invention is an electrical panel enclosure for a power system comprising: a plurality of sequentially interlocked switches capable of being operated in a predetermined sequence to isolate one or more fuses; one or more load-break switches on an outer side of a panel door; one or more non-load-break switches on an inner portion of the enclosure; and, a handle interlocked with the panel door being interlocked to open the panel door only after the one or more load-break switches are opened.

In a further embodiment, the present invention is a method of accessing a safety switch sourced from a power system having a plurality of sequentially interlocked switches capable of isolating one or more fuses. Preferably, the method comprises: positioning one or more exterior switches on the outer side of a panel door to a first exterior position; opening the panel door to reveal one or more interior switches; positioning the one or more interior switches to a first interior position; opening an inner panel door to reveal one or more fuses; and, removing one or more of fuses.

In still a further embodiment, the present invention is a method of securing a safety switch devoid of an active load for operation with a power system having a plurality of sequentially interlocked switches capable of isolating one or more fuses. Preferably, the method comprises: installing one or more fuses; closing one or more inner panel doors to secure the one or more installed fuses; positioning one or more interior switches covering respective one or more fuse areas to a second interior position; closing an exterior door; and positioning one or more exterior switches on an exterior side of the door to a second exterior position.

DETAILED DESCRIPTION

The present invention relates to power systems and more particularly to integrated safety disconnects for power systems. Various modifications to the preferred embodiments and the generic principles and features described herein will be readily apparent to those skilled in the art. Thus, the present embodiments are not intended to be limited to the examples shown but are to be accorded the widest scope consistent with the principles and features described herein.

Embodiments described herein provide a compact and inexpensive fused disconnect safety system (FDSS) or safety switch system for power systems, in which power can safely be disconnected from the switch enclosure from both sides before accessing the fuses of the system. This allows greater flexibility, safety and code compliance in disconnecting particular lines, troubleshooting supply problems, and gaining efficiencies in servicing enclosures over previous implementations.

As used herein, the terms "include," "including," "for example," "e.g.," and variations thereof, are not intended to be terms of limitation, but rather are intended to be followed by the words "without limitation."

Figure 1:
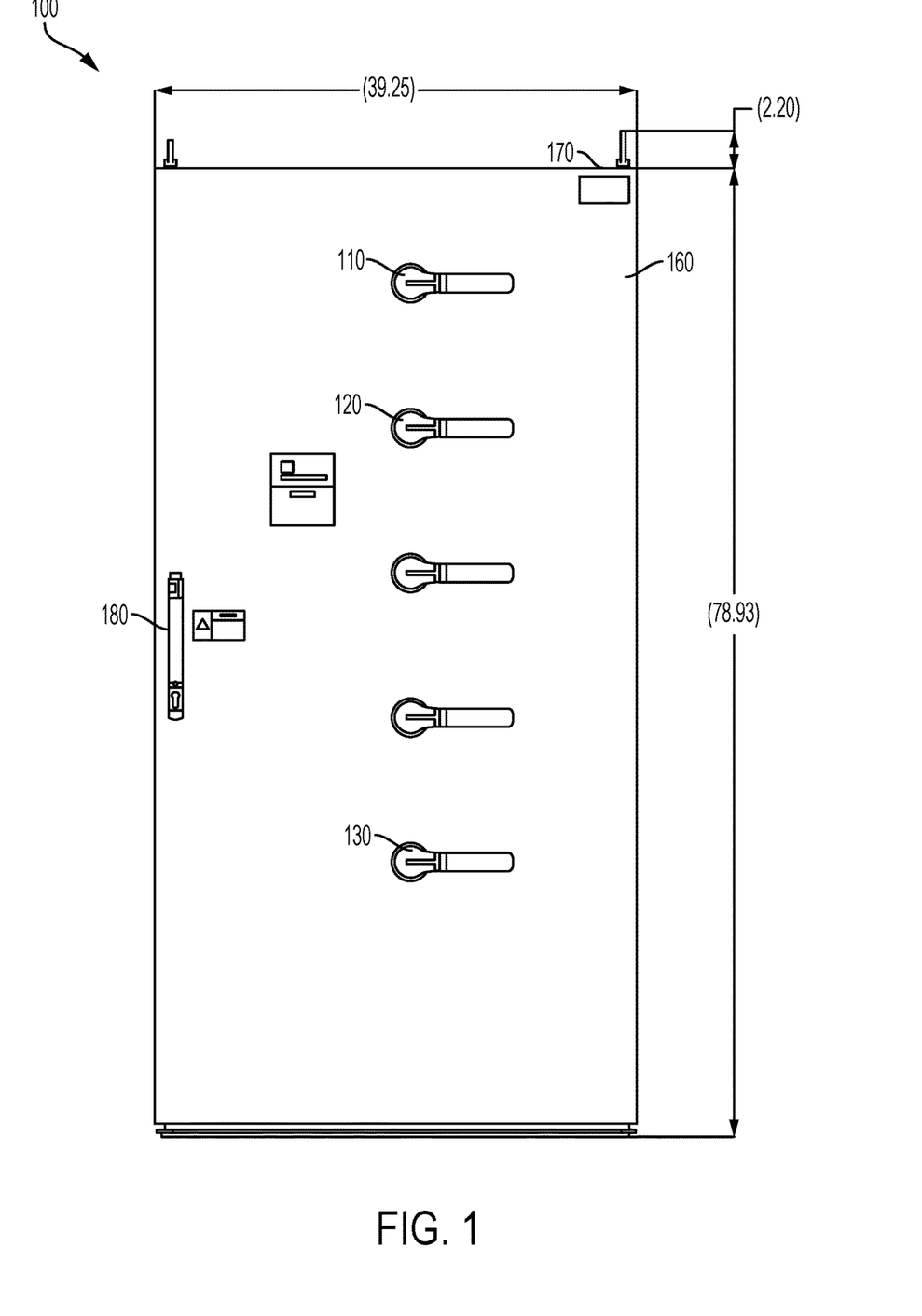
FIG. 1 is a diagram of a front view of a safety switch system of the present invention in accordance with one or more embodiments.

FIG. 1 is a diagram of a front view 100 of a safety switch system of the present invention in accordance with one or more embodiments. From FIG. 1, one or more exterior switches are set forth at 110, 120 and 130. Exterior switches, in one or more preferred embodiment, are load-break switches. The exterior switches are configured with the panel door 160 in a sequentially interlocked manner such that the door 160 is unable to be open on its hinges 170 without first positioning all of the exterior switches to a first position. Preferably, the first position to which each exterior switch is positioned is to that of an "open" or "uninstall" state in which the interlocks of the exterior switches release the door so that it may be opened by pulling on the handle 180. Conversely, to secure the door, all exterior switches should be placed into a second position, that of being "closed" or "install."

Figure 2A:
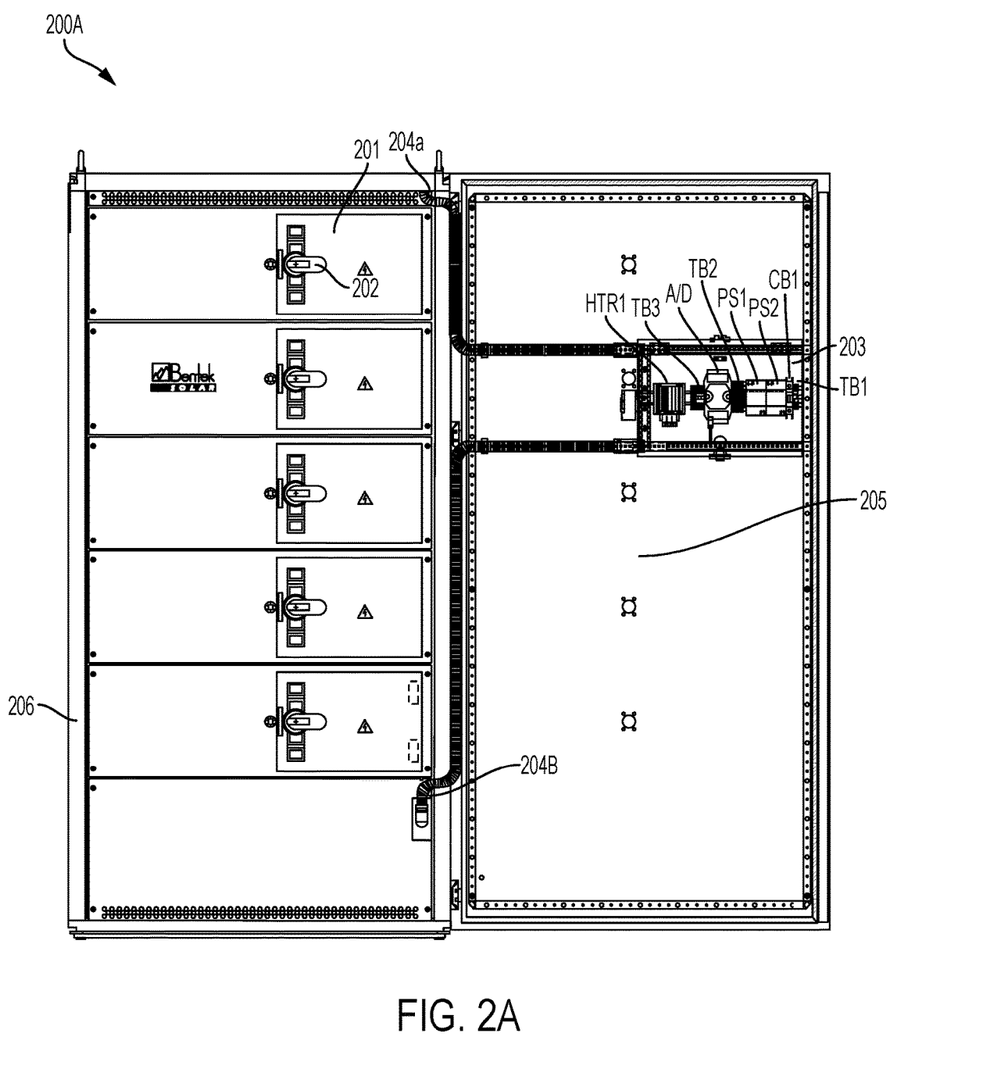
FIG. 2A is a diagram of a front view of a safety switch system of the present invention with the front panel door open in accordance with one or more embodiments.

FIG. 2A is a diagram of a front view 200A of a safety switch system of the present invention with the front panel door open in accordance with one or more embodiments. From FIG. 2A, the interior behind the structure door reveals a fuse panel portion 206 having a plurality of covers 201 covering respective fuse locations. Also depicted are fuse panel handles 202 positioned to one or the other of an open or closed position for their respective fuse panel areas. Power and circuitry interconnections are located at 204a and 204b, where each provides connectivity to the interior panel operation 203 of the exterior door 205.

Figure 2B:
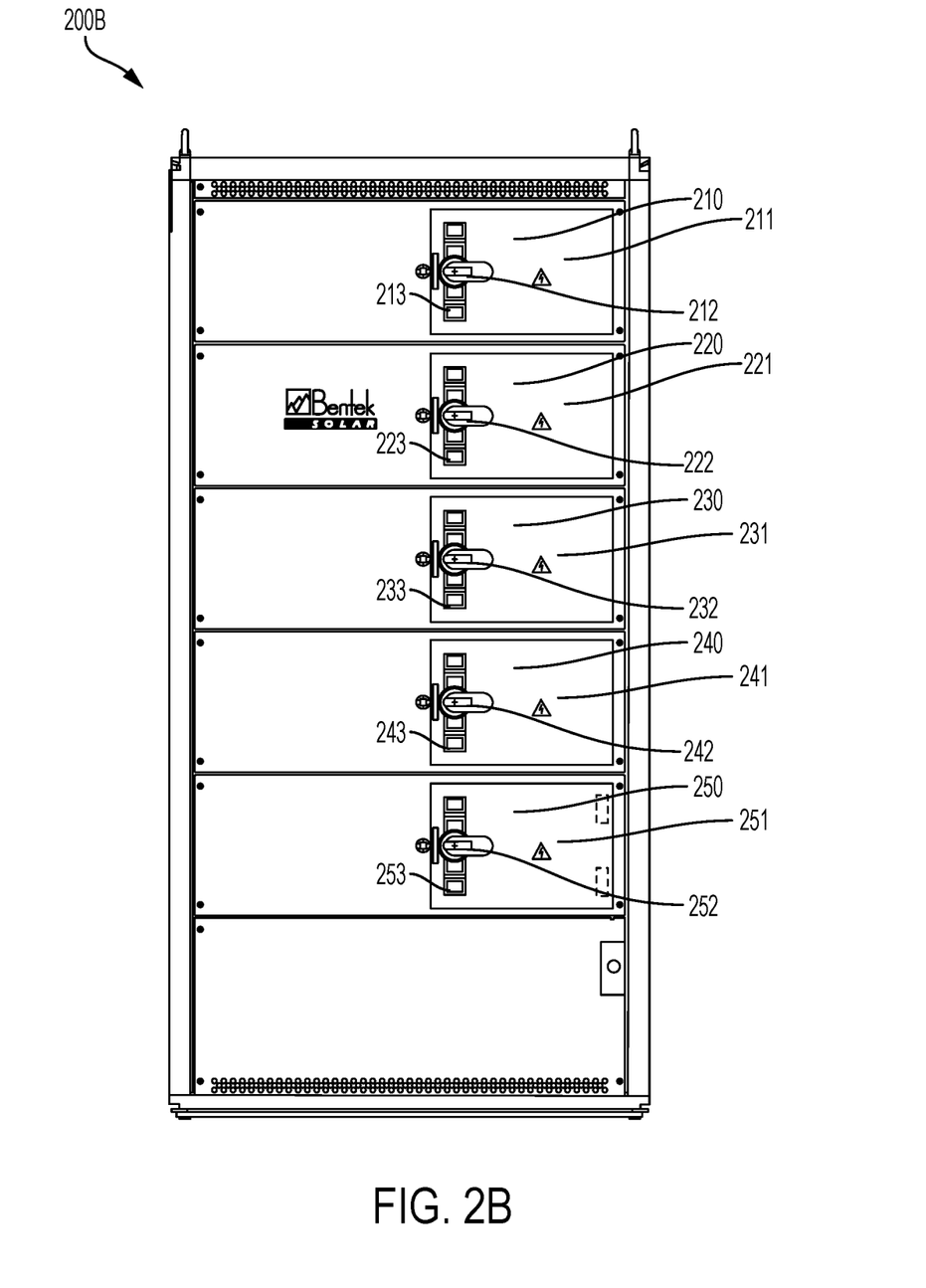
FIG. 2B is a diagram of a front view of a safety switch system of the present invention with the front panel door removed in accordance with one or more embodiments.

FIG. 2B is a diagram of a front view 200B of a safety switch system of the present invention with the front panel door removed in accordance with one or more embodiments. From FIG. 2B, the exterior switches (not pictured) have been aligned to be "open" such that the exterior door has been opened and has been further removed to reveal the interior of the safety switch system, which includes the location of the fuse areas 210, 220, 230, 240 and 250. Each fuse area includes a cover (211, 221, 231, 241, 251) which also includes a handle (212, 222, 232, 242, 252). The handles of the fuse covers are preferably part of the fuse cover such that the cover is fixedly positioned over the fuse area when the handle is proper aligned and positioned. Each fuse cover also preferably includes a window (213, 223, 233, 243, 253) for viewing the contacts of the switch (inside the fuse area) in which an operator may visibly view whether the handle of the fuse cover has been positioned such that the contacts are no longer in contact with a live or active load. Preferably each fuse cover is removable and may be hinged to provide ease of opening and closing. Further, preferably, the interior switches are load-break switches.

Figure 3:
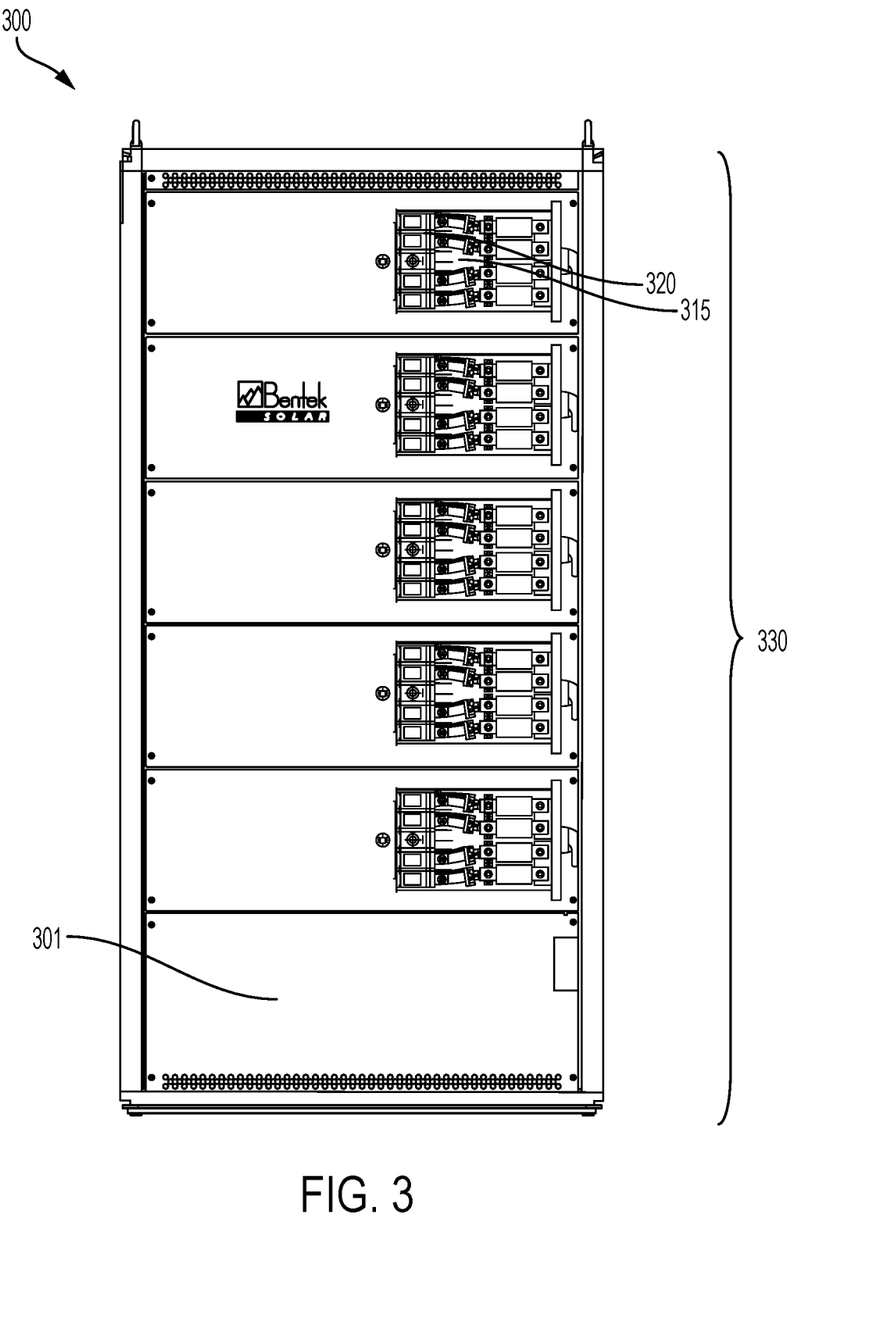
FIG. 3 is a diagram of a front view of a safety switch system of the present invention showing the fuse cover hinged open in accordance with one or more embodiments.

FIG. 3 is a diagram of a front view 300 of a safety switch system of the present invention showing the fuse cover hinged open, without the exterior door, and the corresponding interior 301 of the fuse area in accordance with one or more embodiments. From FIG. 3, the fuse area, previously viewable through the cover window, is located at 320, though it will be appreciated that there are many configurations available while remaining within the scope of the invention. Fuse portions 315 are now visible without the fuse cover panels. Fuses and their arrangements, which may vary from the Figure, are depicted at 330 and are arranged in a manner for the respective application.

Figure 4A:
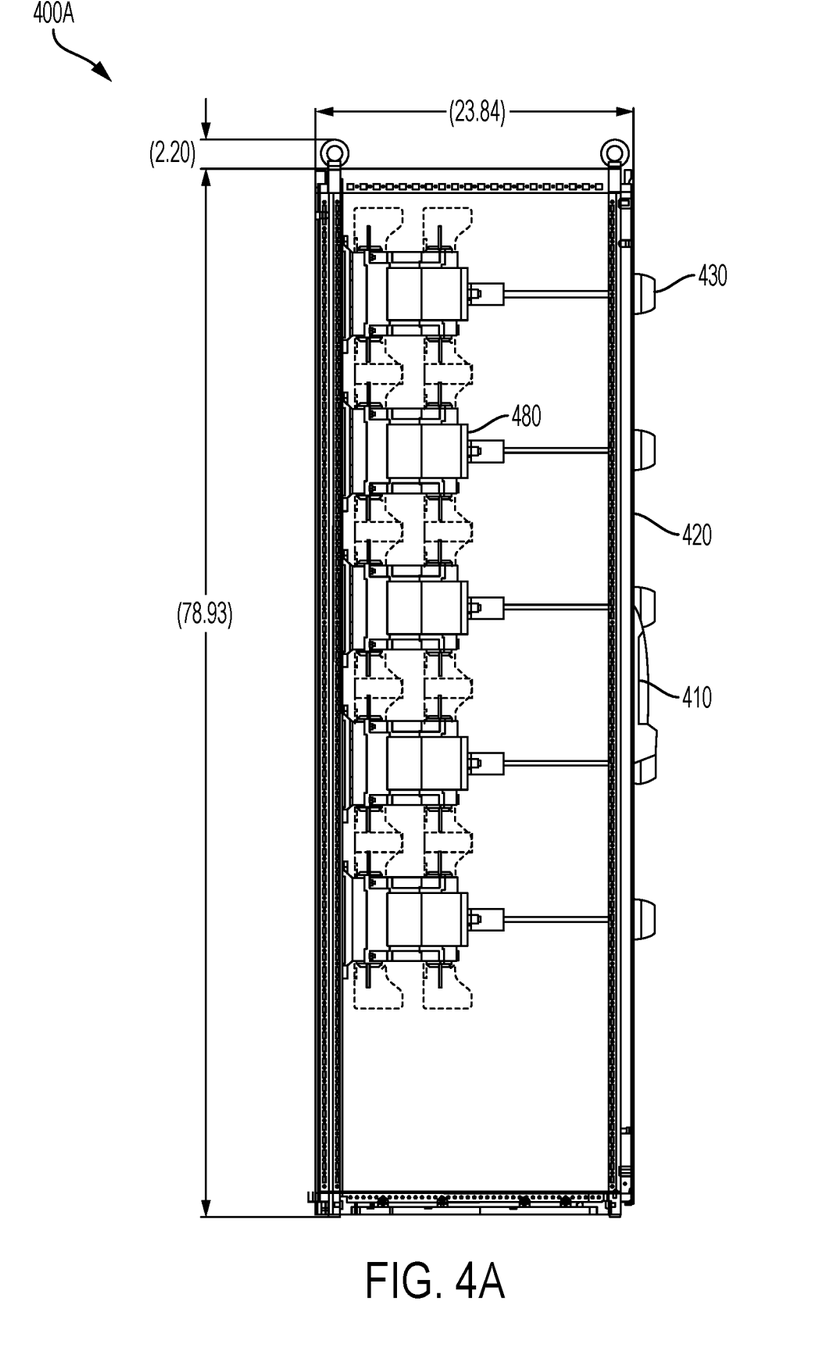
FIG. 4A is a diagram of a side view of a safety switch system of the present invention without fuses in accordance with one or more embodiments.

FIG. 4A is a diagram of a side view 400A of a safety switch system of the present invention without fuses in accordance with one or more embodiments. From FIG. 4, the outer handle is at 410, the outer door is at 420, exterior switches are at 430, and inner switches are located at 480. It will be appreciated that the configuration depicted in FIG. 4A is representative of one possible arrangement and that the present invention is not so limited.

Figure 4B:
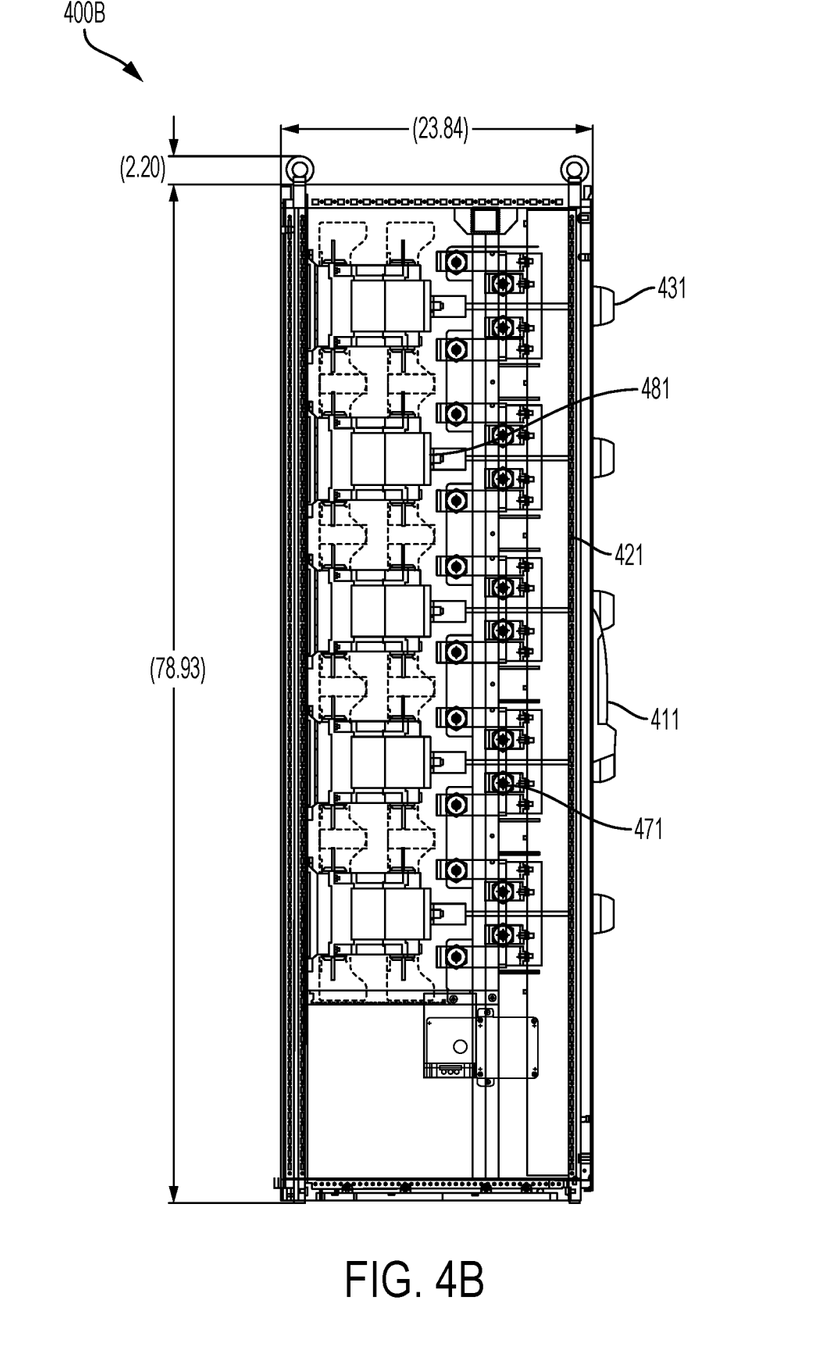
FIG. 4B is a diagram of a side view of a safety switch system of the present invention including fuses in accordance with one or more embodiments.

FIG. 4B is a diagram of a side view of a safety switch system of the present invention including fuses in accordance with one or more embodiments. From FIG. 4B, the outer handle is at 411, the outer door is at 421, exterior switches are at 431, fuses are at 471, and inner switches are located at 481. It will be appreciated that the configuration depicted in FIG. 4B is representative of one possible arrangement and that the present invention is not so limited.

Figure 5A:
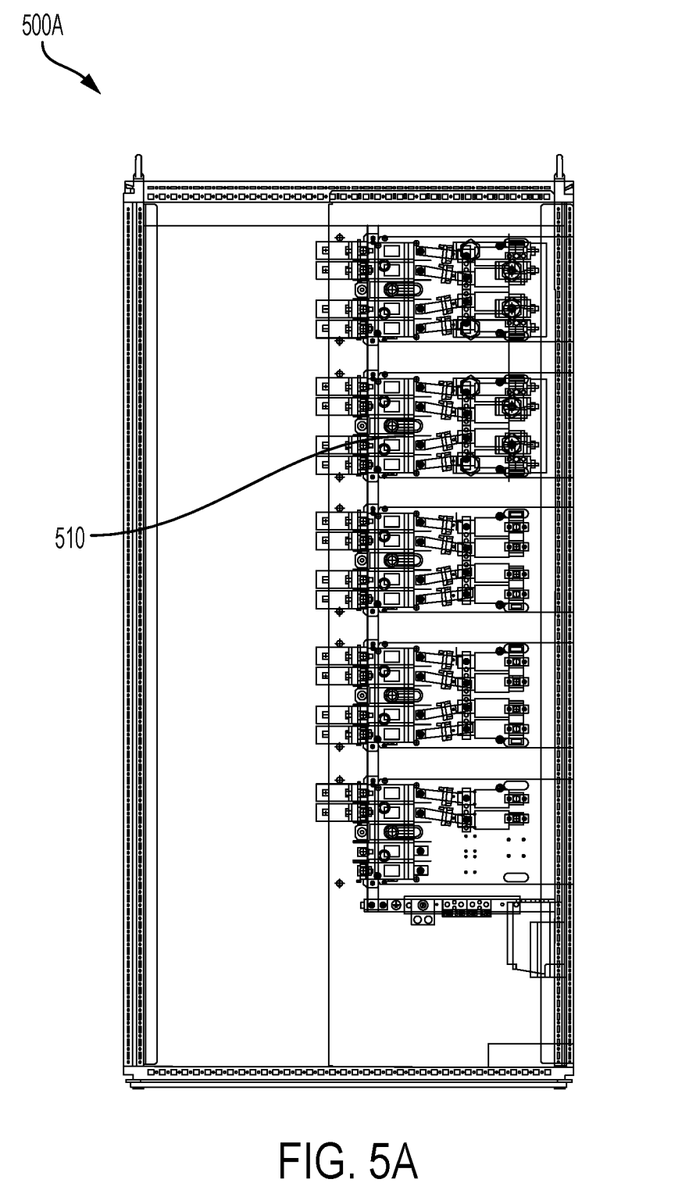
FIG. 5A is a diagram of a view of a safety switch system of the present invention with all panels removed to show fuses supplied by power sources in accordance with one or more embodiments.

FIG. 5A is a diagram of a view of a safety switch system 500A of the present invention with all panels removed to show fuses supplied by power sources in accordance with one or more embodiments. From FIG. 5A, the sequential interlocking steps to open and access the fuses of the safety switch system have been completed by an operator to reveal the fuses, without covers, at 510, in communication with power sources, not shown.

Figure 5B:
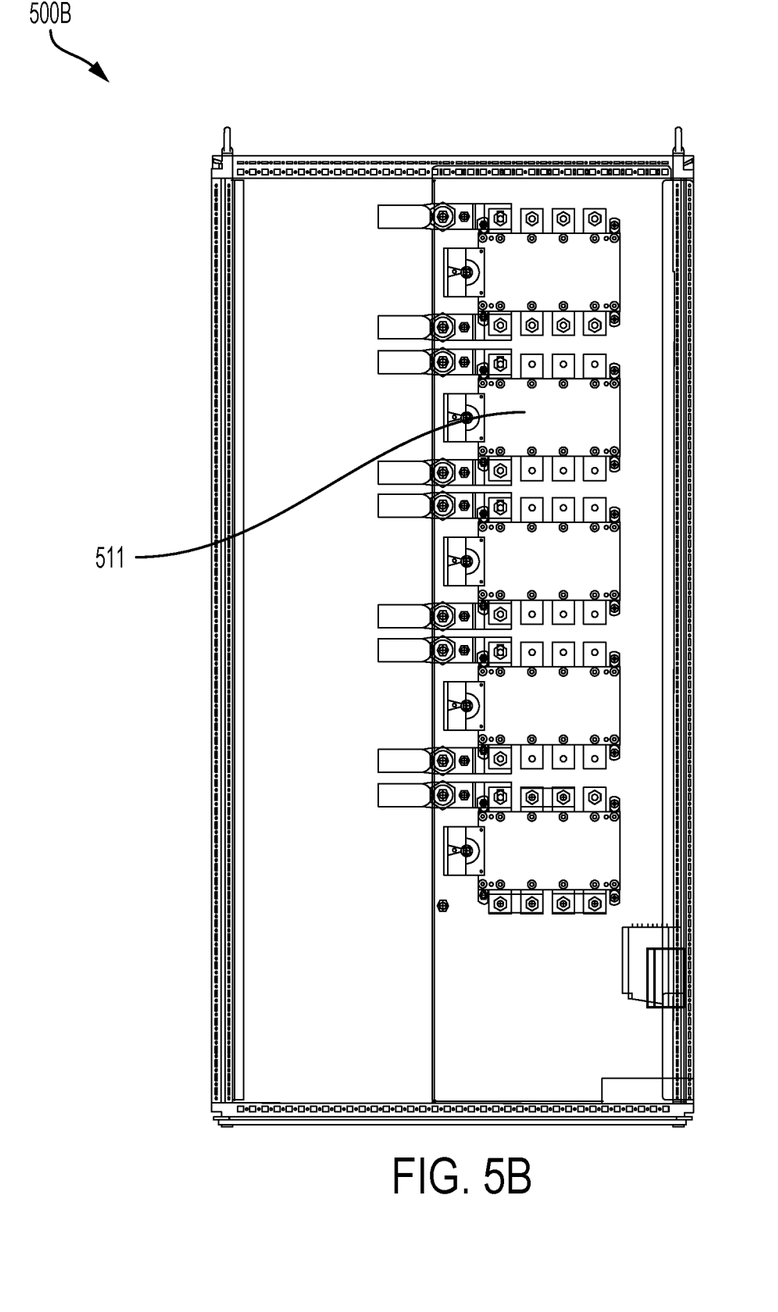
FIG. 5B is a diagram of a view of a safety switch system of the present invention with all panels and fuses removed in accordance with one or more embodiments.

FIG. 5B is a diagram of a view of a safety switch system of the present invention with all panels and fuses removed in accordance with one or more embodiments. From FIG. 5B, the sequential interlocking steps to open and access the fuse area of the safety switch system have been completed by an operator to reveal the connection portions 511, without covers or fuses.

Figure 6:
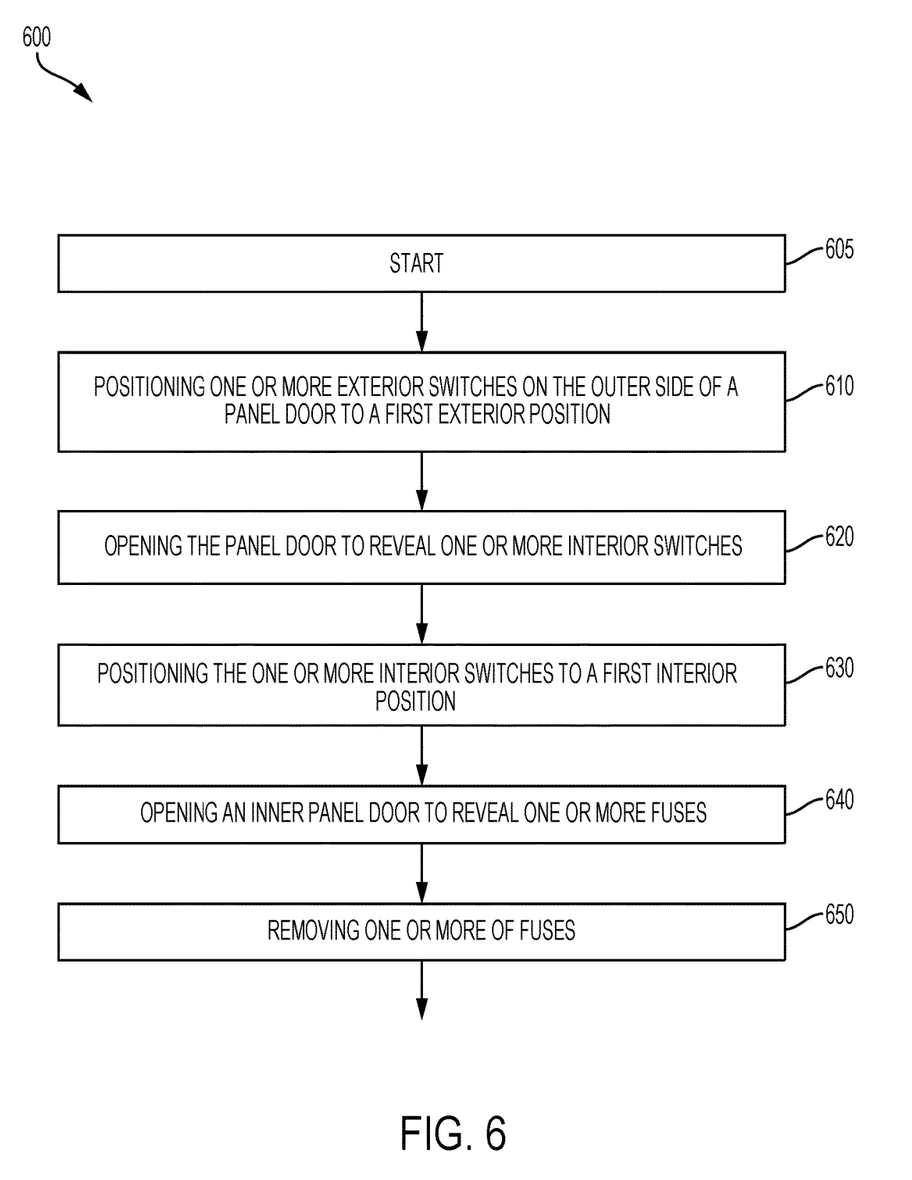
FIG. 6 is a flowchart of the steps to open the safety switch system having sequentially interlocked switches, in accordance with one or more embodiments.

FIG. 6 is a flowchart of the steps to open the safety switch system having sequentially interlocked switches, in accordance with one or more embodiments. From FIG. 6, in a preferred embodiment, the present invention includes a method of accessing a safety switch sourced from a power system having a plurality of sequentially interlocked switches capable of isolating one or more fuses. The method includes starting at 605; positioning one or more exterior switches on the outer side of a panel door to a first exterior position at 610; opening the panel door to reveal one or more interior switches at 620; positioning the one or more interior switches to a first interior position at 630; opening an inner panel door to reveal one or more fuses at 640; and, removing one or more of fuses at 650. Preferably, in one or more embodiments, the method includes the exterior switches being load-break switches and the interior switches being non-load-break switches.

In an alternate embodiment, to secure the system, the present invention includes the method of securing a safety switch devoid of an active load for operation with a power system having a plurality of sequentially interlocked switches capable of isolating one or more fuses, comprising: installing one or more fuses; closing one or more inner panel doors to secure the one or more installed fuses; positioning one or more interior switches covering respective one or more fuse areas to a second interior position; closing an exterior door; and positioning one or more exterior switches on an exterior side of the door to a second exterior position.

The described safety switch system is a convenient and sequential approach to safely remove power from a system and access associated fuses. Further aspects of the system may include current sensing and monitoring. The advantageous approach, safety and accessibility of the described safety disconnect system reduces labor and expense compared to the enclosures used previously.

The present invention may also be described as a fuse disconnect safety system, an electrical panel, a safety disconnect procedure, etc., in accordance with one or more embodiments of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art.

What is claimed is:

1. A system, comprising:
   one or more fuses arranged to be supplied by power from one or more power sources;
   one or more load-break switches arranged to alternately electrically connect and disconnect a power output side of the one or more fuses;
   one or more non-load-break switches arranged to alternately electrically connect and disconnect a power input side of the one or more fuses;
   one or more first actuators operably connected to a respective one of the one or more load-break switches;
   one or more second actuators operably connected to a respective one of the one or more non-load-break switches; and
   a securable fuse cover arranged to physically separate at least one fuse of the one or more fuses from the one or more first actuators, wherein the fuse cover is securable by the one or more second actuators;
   wherein the fuse cover, one or more first actuators, and one or more second actuators are configured to release the fuse cover and enable access to the at least one fuse by sequential operation of the one or more first actuators to open the one or more load-break switches followed by operation of the one or more second actuators to open the one or more non-load-break switches and electrically isolate the at least one fuse.

2. The system of claim 1, wherein the fuse cover comprises a portion via which a contact of one of the one or more non-load-break switches is viewable while the fuse cover is secured.

3. The system of claim 2, wherein the viewable area is a window.

4. The system of claim 1, wherein the fuse cover comprises a plurality of portions via each of which a contact of one of the one or more non-load-break switches is viewable while the fuse cover is secured.

5. The system of claim 1, further comprising:
   a securable first barrier arranged to restrict access to the one or more second actuators;
   wherein the first barrier and the one or more first actuators are configured to release the first barrier and enable access to the one or more second actuators by the operation of the one or more first actuators to open the one or more load-break switches.

6. The system of claim 5, wherein the first barrier comprises a handle configured to open the door only after the one or more load-break switches are opened to isolate the fuse from an active load to.

7. The system of claim 5, further comprising an enclosure having the first barrier and a housing configured to house the one or more fuses, the load break switches, the non-load-break switches, the fuse cover, and the one or more second actuators;

wherein the first barrier is securable to the housing;
wherein the first barrier comprises the one or more first actuators; and
wherein the first barrier and the one or more first actuators are configured to release the first barrier from securement to the housing.

8. The system of claim 7, further comprising a second barrier comprising a plurality of the securable fuse cover each arranged to physically separate at least one respective fuse of the one or more fuses from the first barrier;
wherein the fuse covers are securable to the second barrier;
wherein the second barrier comprises the one or more second actuators;
wherein the fuse covers are configured with respective ones of the one or more second actuators to release the fuse covers and enable access to the one or more fuses by the operation of the one or more second actuators to open the one or more non-load-break switches and electrically isolate the one or more fuses.

9. The system of claim 1, wherein the fuse cover is secured to physically separate at least one fuse from the one or more first actuators and one or more second actuators only when the corresponding second actuator is fixedly positioned with the corresponding non-load break switch closed.

10. The system of claim 1, further comprising:
a securable panel cover including a panel cover body and the fuse cover;
wherein the fuse cover is securably hinged to the panel cover body.

11. An electrical panel enclosure, comprising:
a housing;
a door configured to releasably secure the housing closed by operation of one or more first switch actuators operably coupled to the door;
a divider arranged to divide an inner part within the enclosure from an outer part within the enclosure, wherein the divider comprises one or more openings to releasably secure the inner part closed from the outer part by operation of one or more second switch actuators operably coupled respectively to one or more fuse covers configured to cover the one or more openings, respectively;
one or more load-break switches located in the inner part and operably connected respectively to the one or more first switch actuators;
one or more non-load-break switches located in the inner part and operably connected respectively to the one or more second switch actuators; and
one or more fuses located within the inner part to be accessible via the openings.

12. The electrical panel enclosure of claim 11,
wherein the first switch actuators are installed in the door; and
wherein the second switch actuators are installed in the divider and inaccessible while the door is closed.

13. The electrical panel enclosure of claim 12,
wherein the divider comprises one or more panels; and
wherein the one or more openings are openings in the one or more panels.

14. The electrical panel enclosure of claim 12, further comprising:
a handle installed in the door;
wherein the handle is operably interlocked with the one or more load-break switches to prevent the door from opening when there is an active load to the electrical panel enclosure.

15. The electrical panel enclosure of claim 11, wherein the one or more fuse covers each include a portion through which one or more contacts of one of the one or more non-load-break switches is viewable.

16. A method of accessing one or more fuses in a safety system sourced from a power system, the safety system having a plurality of switch actuators arranged to isolate the one or more fuses by sequential operation, comprising:
positioning one or more first switch actuators on an outer door to a first exterior position;
opening the door to reveal one or more second switch actuators;
positioning the one or more second switch actuators to a first interior position isolating the one or more fuses;
with the one or more fuses isolated in accordance with the first switch actuators in the first exterior position and the second switch actuators in the first interior position, opening an inner door to reveal at least one fuse of the one or more fuses; and,
removing the at least one fuse of the one or more fuses.

17. The method of claim 16, wherein the one or more first switch actuators are operably coupled to open and close respective load-break switches.

18. The method of claim 17, wherein the one or more second switch actuators are operably coupled to open and close respective non-load-break switches.

19. The method of claim 18,
wherein positioning the one or more first switch actuators to the first exterior position operates to open the respective load-break switches; and
wherein positioning the one or more second switch actuators to the first interior position operates to open the respective non-load-break switches.

20. The method of claim 16, wherein the one or more second switch actuators are operably coupled to open and close respective non-load-break switches.

* * * * *